No. 745,505. PATENTED DEC. 1, 1903.
J. LEE.
METHOD OF CUTTING CAN ENDS.
APPLICATION FILED DEC. 12, 1902.
NO MODEL.
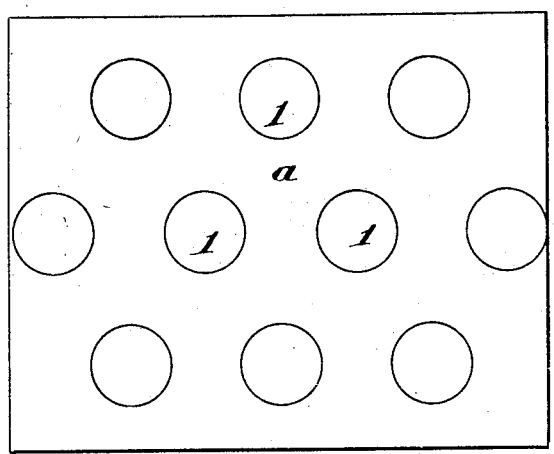
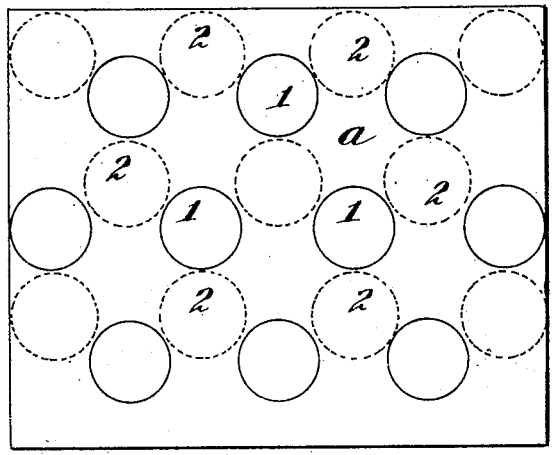
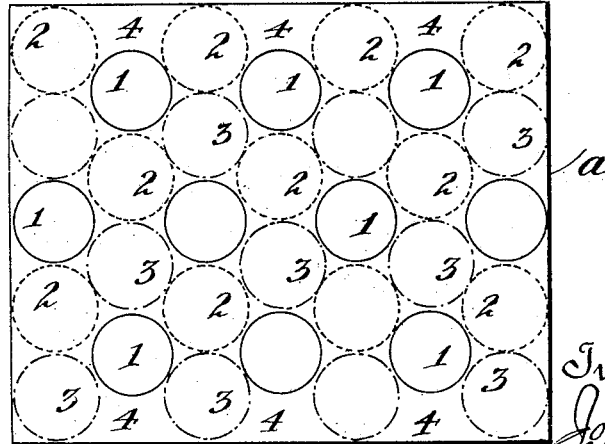
Witnesses.
Inventor.
John Lee
by Spear & Sealy
Attorneys No. 745,505.

Patented December 1, 1903.

UNITED STATES PATENT OFFICE.

JOHN LEE, OF SAN FRANCISCO, CALIFORNIA.

METHOD OF CUTTING CAN ENDS.

SPECIFICATION forming part of Letters Patent No. 745,505, dated December 1, 1903.

Application filed December 12, 1902. Serial No. 134,998. (No model.)

*To all whom it may concern:*

Be it known that I, JOHN LEE, a citizen of the United States, residing at San Francisco, in the county of San Francisco and State of California, have invented certain new and useful Improvements in Cutting Can Ends, of which the following is a specification.

My invention relates to a novel method of cutting can-heads from single sheets by gangs of dies, so as to produce the ultimate possible number of heads from such a sheet by such gangs and so as to leave the ordinary waste material of the sheet in areas suitable to produce other though smaller heads or other articles instead of being fit only for the scrap-heap. By this process I economize time and material and derive from the sheet of metal all the heads or articles it is capable of producing.

The accompanying drawings show the application of my method of cutting to a sheet which for the sake of illustration only I shall assume to be twenty and three-fourths inches by sixteen and three-fourths inches, from which are produced ordinary one-pound salmon-can bottoms.

Figure 1 is a plan view of such a sheet from which have been cut by a gang of staggered dies ten staggered can heads or bottoms. Fig. 2 represents the same sheet, from which have been cut by a secondary arrangement of staggered dies eleven additional can heads or bottoms. Fig. 3 represents the same sheet supposed to be reversed and having cut from it by the same gang of dies which has already cut one series of Fig. 2 a third series of bottoms, which practically fill up the sheet, but leave some spaces of solid metal, owing to the arrangement employed by me.

In Fig. 1 is shown a sheet of metal $a$, from which by a staggered arrangement of dies ten can covers or bottoms have been cut, as indicated by the circles 1.

In Fig. 2 another staggered arrangement of dies has been applied to the sheet of Fig. 1 and has cut therefrom the eleven can-bottoms or can-heads shown in dotted circles 2, making twenty-one in all. Now if I reverse the sheet of Fig. 2 I can from the same gang of dies cut a third staggered series of can-heads or can-bottoms, (indicated by the dash-dot circles 3,) make thirty-two in all. All cuts from the gangs of dies have resulted in staggered arrangements of cut heads or bottoms and the final result (indicated in Fig. 3) preserves the same staggered arrangement.

In the illustration shown I have produced from a sheet of the size referred to the greatest possible number of one-pound salmon-can ends. In doing so and by using the staggered arrangement I have left solid areas of metal 4 adjacent to the edges of the sheet. These areas can be utilized in cutting smaller heads or caps or other articles additionally to those produced by the regular operation.

The principle of operation remains the same whatever may be the proportions of the sheets or of the heads to be cut from them.

Having thus fully described my invention, what I claim as new, and desire to secure by Letters Patent, is—

The method of cutting can ends, which consists, in cutting from a sheet a staggered arrangement of such ends by a staggered gang of dies, then cutting another staggered arrangement of ends by a second staggered gang of dies, and then changing the position of the sheet, and by said staggered gang of dies cutting a third staggered arrangement of ends; so that the cuttings will be in parallel rows with the cuttings of one row opposite the spaces between the cuttings of the adjacent row and marginal areas of solid metal will be left larger than the areas between the adjacent cuttings, substantially as described.

In testimony whereof I have affixed my signature, in presence of two witnesses, this 26th day of November, 1902.

JOHN LEE.

Witnesses:
S. W. SEELY,
F. M. BURT.